United States Patent [19]

Fannin

[11] Patent Number: 4,472,001
[45] Date of Patent: Sep. 18, 1984

[54] FLUID PRESSURE BRAKING SYSTEM

[75] Inventor: Richard C. Fannin, Grafton, Ohio

[73] Assignee: The Bendix Corporation, Southfield, Mich.

[21] Appl. No.: 368,932

[22] Filed: Apr. 16, 1982

[51] Int. Cl.³ .............................................. B60T 13/22
[52] U.S. Cl. ........................................ 303/9; 303/6 M; 303/29; 303/30; 303/71
[58] Field of Search .............. 303/71, 9, 6 M, 28, 303/29, 30, 13, 25, 26, 27, 57–67, 6 A, 6 R, 7, 8, 40; 188/170

[56] References Cited

U.S. PATENT DOCUMENTS

| Re. 30,205 | 2/1980 | Carton et al. | 303/7 |
| 3,504,946 | 4/1970 | Valentine et al. | 303/13 X |
| 4,003,605 | 1/1977 | Fannin | 303/71 X |
| 4,057,297 | 11/1977 | Beck et al. | 303/71 |
| 4,182,535 | 1/1980 | Fannin | 303/71 X |

Primary Examiner—Douglas C. Butler
Attorney, Agent, or Firm—Ken C. Decker; William N. Antonis

[57] ABSTRACT

Fluid pressure braking system (10) for supplying fluid pressure to actuate the service brake actuators (26) and to supply hold-off pressure to release the spring brake actuators (22) of the trailer portion of a tractor-trailer combination vehicle includes a spring brake relay valve (32) having a delivery port (38) communicated with the spring brake actuators (26), a control port (34) communicated with the trailer supply line or conduit (12), and a supply port (36) communicated with the supply line (12) through a bypass passage (40). Accordingly, hold-off pressure can be supplied directly to the spring brake actuator (26) before the reservoir (44) is fully charged. The reservoir (44) is charged through the supply line (12) and a pressure protection valve (54) which opens to permit charging of the reservoir (44) only when the pressure in the system exceeds a predetermined level.

15 Claims, 3 Drawing Figures

FLUID PRESSURE BRAKING SYSTEM

This invention relates to a fluid pressure braking system for the trailer portion of a tractor-trailer combination vehicle.

The trailer portion of a tractor-trailer heavy duty combination vehicle is normally provided with reseroirs which are charged with air from the air compressor carried on the tractor. The reservoirs supply hold-off pressure to release spring applied, fluid pressure released parking/emergency brakes. The reservoirs also supply compressed air to actuate the conventional service brake actuators. Two conduits or lines interconnect the tractor and trailer. The supply line or conduit communicates air to the trailer to charge the reservoirs carried thereon and to maintain them at a predetermined pressure level while the vehicle is operated. The control line or conduit provides an actuating signal to appropriate valving that controls communication between the reservoirs and the service brakes. In prior art trailer braking systems, such as that disclosed in U.S. Pat. No. RE 30,205 (Carton et al) and No. 4,182,535 (Fannin), the trailer reservoirs must be charged to a predetermined pressure level before hold-off pressure can be communicated to release the spring-applied brakes. The system disclosed in the present application uses air pressure from the tractor to release the trailer spring brakes before the reservoirs on the trailer begin to charge. The system is also designed so that a service brake failure does not result in an undesirable automatic application of the spring brakes.

Other features and advantages of the invention are disclosed in the following description with reference to the accompanying drawings in which.

Figure 1:
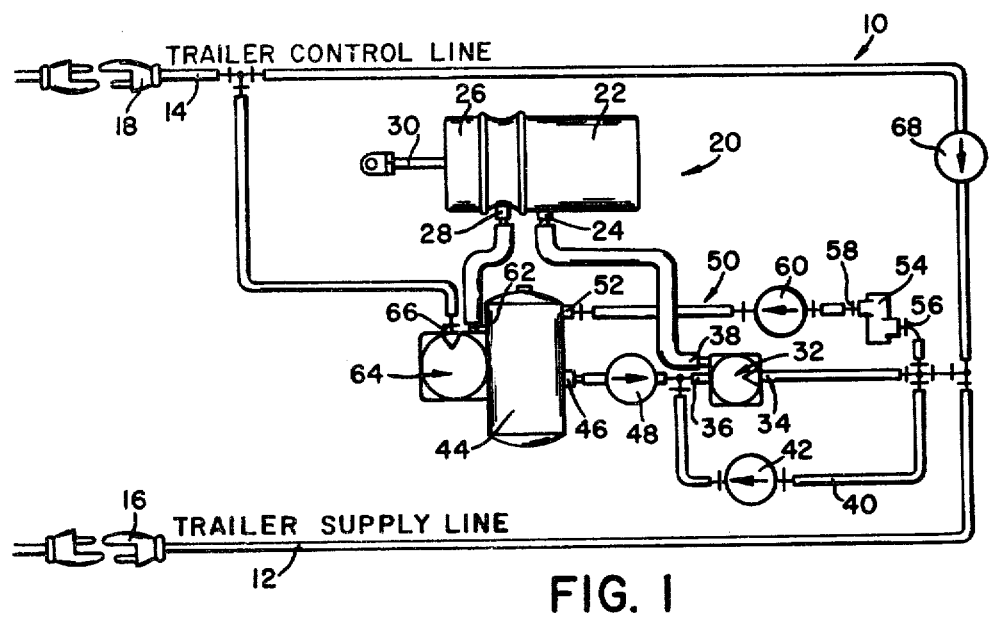
FIG. 1 is a schematic illustration of a first embodiment of a trailer braking system made pursuant to my present invention.

Referring now to the drawings, the system disclosed in FIG. 1 is adapted for use on a trailer having a single axle which requires only a single service reservoir. Referring to FIG. 1, the trailer braking system 10 includes a trailer supply line 12 and a trailer control line 14, both of which terminate in conventional glad hand connectors 16, 18, which are adapted to be engaged with corresponding connectors on corresponding lines on the tractor. Accordingly, the trailer supply line 12 is communicated to the tractor air supply so that the supply line 12 is maintained at a predetermined pressure level at all times while the vehicle is in operation. The trailer control line 14 is connected to the operator's foot valve (not shown) and is pressurized to a predetermined level when a service brake application is effected.

The system 10 further includes a tandem spring and service brake actuator generally indicated by the numeral 20. The actuator 20 is conventional and will not be described in detail herein. However, the spring actuating portion 22 of actuator 20 includes a port 24 through which hold-off pressure is communicated to collapse the spring (not shown) within the actuator 20, to thereby release the spring brakes. The service actuating portion 26 of the actuator 20 is provided with a port 28 that is communicated to a fluid pressure reservoir (which will be described in detail hereinafter) when a service brake actuation is effected. The service brake actuation portion 26 responds to fluid pressure to effect a brake actuation. The actuator 20 further includes a plunger 30 which projects from the actuator 20 and which is connected through a force transmitting linkage (not shown) to the foundation brakes of the vehicle. When the hold-off pressure holding the spring in the collapsed condition is vented, the spring forces the plunger 30 outwardly from the actuator 20 to actuate the vehicle brakes. Similarly, when hold-off pressure is communicated into the spring brake actuation portion 22, the brakes are released, but a service brake application may be effected by communicating fluid pressure through the port 28 into the service brake actuation portion 26. Although only one of the actuators 20 is illustrated in the drawing, the actuators 20 are normally installed in pairs on an axle. In order to simplify the drawing, the other actuator mounted on the common axle has been omitted.

The system 10 further includes a spring brake relay or control valve generally indicated by the numeral 32. The valve 32 is conventional and is provided with a control port 34, a supply port 36, and a delivery port 38. The spring brake relay valve 32 is responsive to a pressure signal at the control port 34 to communicate the supply port 36 with the delivery port 38. When the pressure signal at the control port 34 is terminated, the spring brake relay valve 32 cuts off communication between the supply port 36 and the delivery port 38, and vents the delivery port 38 to atmosphere. As illustrated in FIG. 1, the delivery port 38 at the spring brake relay valve 32 is communicated to the port 24 of the actuator 20 to supply hold-off pressure to collapse the brake applying spring housed within the actuator 20. The control port 34 is communicated directly with the trailer supply conduit 12. The supply conduit 12 includes a bypass passage 40 which communicates the control port 34 of spring brake relay valve 32 with the supply port 36. A one-way check valve 42 is installed in the bypass passage 40 and permits communication through the bypass passage 40 from the control port 34 to the supply port 36, but prevents communication in the reverse direction. A conventional fluid pressure storage means or reservoir 44 includes an outlet port 46 which is communicated to the supply port 36 of the spring brake relay valve 32 through a one-check valve 48 which permits communication from the reservoir 44 to the supply port 36, but prevents communication in the reverse direction.

The control line or conduit 12 further includes a branch 50 which communicates from the control port 34 to an inlet port 52 of the reservoir 44. A pressure protection valve 54 is installed in the branch 50 and includes a supply port 56 and a delivery port 58. The pressure protection valve 54 is conventional, having been manufactured for a number of years by the assignee of the present invention as well as many other manufacturers. The pressure protection valve 54 is responsive to the pressure level at the supply port 56 to communicate the supply port 56 with the delivery port 58 only when the pressure level at the supply port 56 is above a predetermined level. At pressures below the predetermined level, the pressure protection valve 54 shuts off communication through the branch 50. A one-way check valve 60 is installed in the branch 50 between the ports 52 and 58 and permits communication into the port 52, but prevents communication in the reverse direction.

The port 28 of the tandem brake actuator 20 is communicated to the delivery port 62 of a conventional service brake relay valve generally indicated by the numeral 64. The service brake relay valve 64 further includes a control port 66 that is communicated with the trailer control conduit 14. The relay valve 64 is responsive to a pressure control signal at the control port 66 to communicate the fluid pressure content of the reservoir 44 with the delivery port 62 of the relay valve 64. Accordingly, a service brake actuation is effected since the port 28 is communicated to the port 62. The trailer control line 14 is also connected to the supply line 12 through a check valve 68 to provide anti-compounding. The check valve 68 is installed in the branch 70 of the trailer control line 14, and permits fluid communication out of the trailer control line 14, but prevents the fluid pressure in the supply conduit 12 from communicating into the trailer control conduit 14.

In operation, the trailer supply and control lines 12, 14 are connected to the corresponding lines of the tractor (not shown). When the vehicle is to be moved, the vehicle engine is started and the trailer supply line 12 is connected to the air pressure system of the tractor so that fluid pressure is communicated through supply line 12 to the control port 34 of the spring brake relay valve 32. At the same time, fluid pressure from supply line 12 is communicated through the bypass passage 40 to the supply port 36 of the spring brake relay valve 32. Because of the pressure signal at the control port 34, fluid pressure is communicated from the branch 40 to the port 24 of the spring portion 22 of the tandem actuator 20, thereby supplying hold-off pressure to release the spring brake and to permit the vehicle to be moved. When the pressure level in the supply conduit 12, the branch 40, and at the port 24 raises above a predetermined level sufficient to cause the spring brakes to release and to cause the pressure protection valve 54 to open, fluid pressure is communicated from the port 56 of protection valve 54 to the port 58 thereof, to thereby permit fluid pressure communication into the reservoir 44 to charge the latter with fluid pressure. During normal operation of the system, subsequent charging of the supply conduit, hold-off pressure is maintained at the port 24 by the fluid pressure level in the service reservoir 44 through the check valve 48. Of course, if the pressure in the service reservoir 44 is available, it can be used when the vehicle is to be moved, and will provide a much quicker release of the spring brakes than is possible with charging through the supply line 12. When a service brake application is effected, the trailer control conduit 14 is pressurized, thereby causing a pressure signal to be communicated to the control port 66 of the relay valve 64. The control signal causes the relay valve 64 to communicate the fluid pressure content of the reservoir 44 with the service brake port 28, thereby effecting a service brake application.

Anti-compounding, so that both the spring and the service brakes cannot be applied at the same time, is provided through the branch 70 of the control line 14 through the check valve 68. When the supply conduit 12 is vented to thereby remove the pressure signal at the control port 34 of the spring brake relay valve 32, the delivery port 38, and therefor the spring brake port 24, will be communicated to atmosphere and communication between the supply port 36 and delivery port 38 will be cut off and the spring brakes will apply. Accordingly, any pressure signal communicated through the control line 14 will blow out through the open supply conduit 12, thereby preventing application of the service brakes at the same time that the spring brake is applied.

Figure 2:
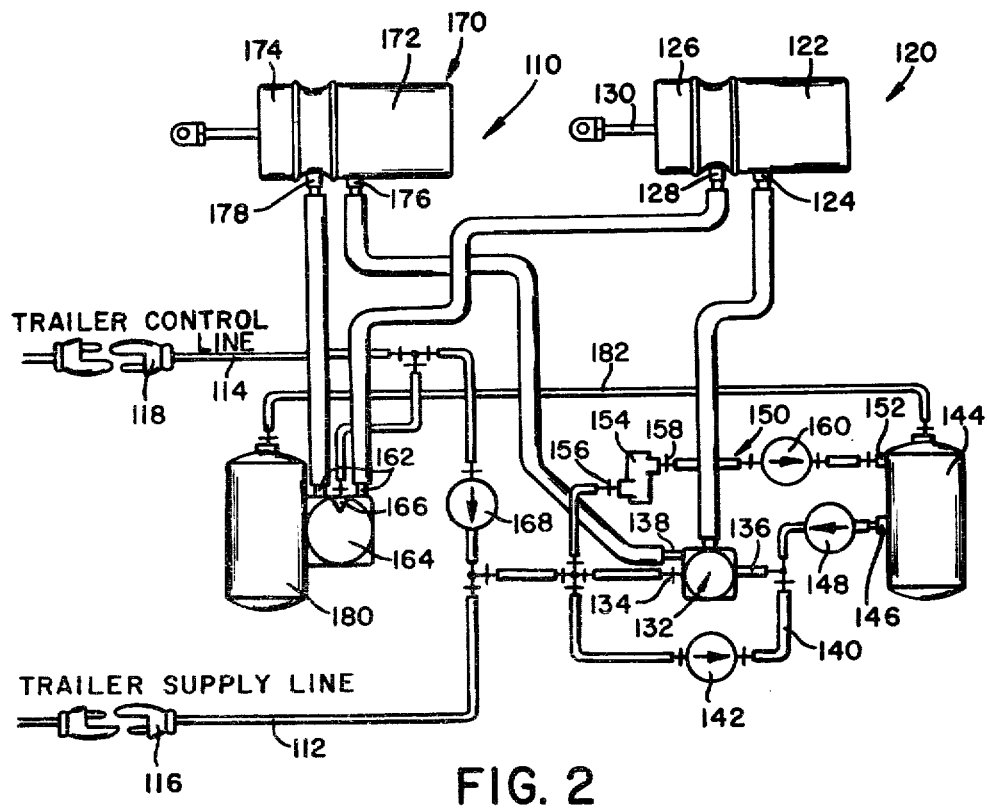
FIG. 2 is a schematic illustration of a second embodiment of a trailer braking system made pursuant to my present invention.

Referring now to the alternate embodiment of FIG. 2, elements substantially the same as those in the embodiment of FIG. 1 retain the same reference character, but increased by 100. The system shown in FIG. 2 is for a four-wheel trailer having spring brakes on both axles. Accordingly, a second tandem actuator 170 is illustrated in FIG. 2, and a corresponding actuator (not shown) would be mounted on the other wheel of the axle upon which the actuator 170 is mounted. The actuator 170, as does the actuator 120, includes a spring brake portion 172 and a service brake portion 174, a spring brake port 176, and a service brake port 178. Because of the larger air volume required to actuate the service brakes and the supply hold-off pressure to the four tandem actuators necessary in the system of FIG. 2 as opposed to the pair of actuators necessary in the system of FIG. 1, a second service reservoir 180 is provided in the system which is communicated at all times through an open conduit 182 to the service brake reservoir 144. The service brake relay valve 164 is mounted on the reservoir 180, and the fluid pressure necessary to effect a service brake actuation is communicated to all of the actuators through the relay valve 164. Similarly, the spring brake relay valve 132 is communicated both to the spring brake port 176 of the tandem actuator 170 and to the spring brake port 124 of the tandem actuator 120. Accordingly, hold-off pressure to all of the tandem actuators is supplied through the spring brake relay valve 132. This system, therefore, operates in the same way as does the system illustrated in FIG. 1.

Figure 3:
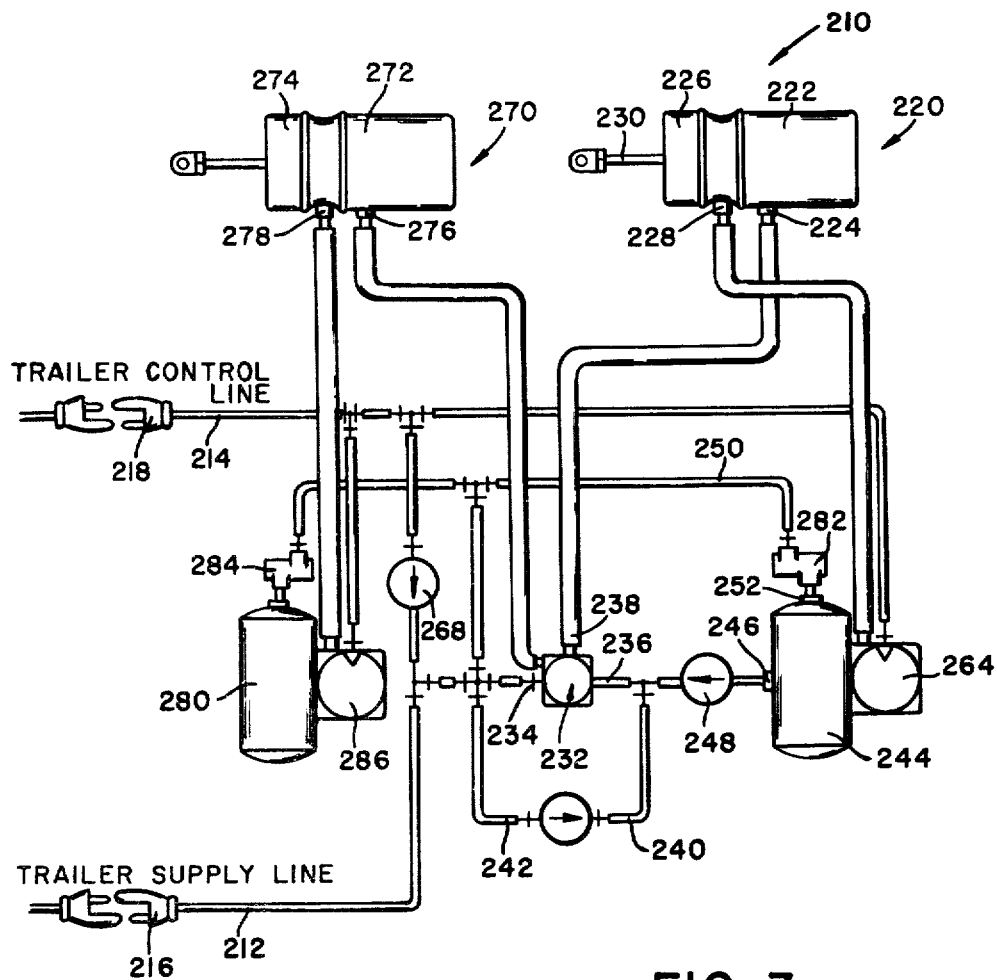
FIG. 3 is a schematic illustration of a third embodiment of a trailer braking system made pursuant to my present invention.

Referring now to the system of FIG. 3, elements the same or substantially the same as corresponding elements in the system of FIGS. 1 or 2 retain the same reference numerals, except that they are increased by 200. Referring to FIG. 3, the only difference between the system of FIGS. 2 and 3 is that the system of FIG. 3 is provided with separate pressure protection valves 282, 284, that individually protect each of the service reservoirs 280, 244. Accordingly, the reservoirs 280, 244 will not be charged until the pressure level in the spring brakes is charged above the pressure level necessary to cause the pressure protection valves to open. The other difference between the system of FIG. 2 and FIG. 3 is that the service brakes on each axle are controlled by separate relay valves 264, 286 mounted on the reservoirs 244, 280. Accordingly, if one of the service reservoirs 244 or 280 fails, service brakes are maintained on the other axle because cross communication between the intact reservoir with the failed reservoir is prevented by closure of the corresponding pressure protection valve 282, 284.

I claim:

1. Fluid pressure braking system comprising a service brake actuator responsive to fluid pressure for effecting a service brake application, a spring brake actuator released by hold-off pressure communicated from said braking system, fluid pressure storage means for storing fluid pressure, a supply conduit for communicating fluid pressure to said storage means and to said spring brake actuator, and control valve means having a supply port and a control port each communicated to the fluid pressure level in said supply conduit, a delivery port communicated to said spring brake actuator to supply hold-off pressure thereto, said control valve means being responsive to a pressure level at said control port to communicate said supply and delivery ports, whereby said control valve means responds to pressure communicated through the supply line and supplied simultaneously to said control and supply ports to communicate supply conduit pressure directly from the supply conduit to said spring brake actuator through said supply and delivery ports of said control valve means to thereby supply hold-off pressure to the spring brake actuator before the storage means is fully charged with fluid pressure.

2. Fluid pressure braking system as claimed in claim 1, wherein said supply conduit includes a bypass passage communicating the control and supply ports of said control valve means, and one-way check valve means in said bypass passage permitting communication from said control port to said supply port, but preventing communication in the reverse direction.

3. Fluid pressure braking system as claimed in claim 1, wherein said storage means is communicated to the supply port of the control valve means, and one-way check valve means permitting communication from said storage means into said supply port, but preventing communication in the reverse direction.

4. Fluid pressure braking system as claimed in claim 3, wherein said supply conduit includes a bypass passage communicating the control and supply ports of said control valve means, and one-way check valve means in said bypass passage permitting communication from said control port to said supply port, but preventing communication in the reverse direction.

5. Fluid pressure braking system as claimed in claim 1, wherein said supply conduit communicates with said storage means through pressure protection valve means which closes to prevent communication into said storage means when the pressure level in said supply conduit is below a predetermined level, but opens to permit the supply conduit to charge the storage means when the pressure level in the conduit is above said predetermined level.

6. Fluid pressure braking system as claimed in claims 1, 2, 3 or 5, wherein service brake valve means controls communication between said storage means and said service brake actuator and a control conduit for communicating a pressure signal to said service brake valve means causing the latter to communicate said storage means with the service brake actuators, said control conduit being communicated to the control port of said control valve means, and one-way check valve means permitting communication from said control conduit into said control port, but preventing communication in the reverse direction.

7. Fluid pressure braking system as claimed in claim 3, wherein said storage means includes a pair of intercommunicated reservoirs, and service brake valve means controlling communication between one of said reservoirs and said service brake actuator, the other of said reservoirs being communicated to said supply port of said control valve means, and pressure protection valve means controlling communication between said supply line and said storage means, said pressure protection valve means closing to prevent communication into said storage means when the pressure level in said supply conduit is below a predetermined level, but opening to permit the supply conduit to charge the storage means when the pressure level in the conduit is above a predetermined level.

8. Fluid pressure braking system as claimed in claim 7, wherein said pressure protection valve means includes a pair of pressure protection valves separately protecting each of said reservoirs, there being at least two of said service brake actuators, and a pair of service brake valve means, each of said service brake valve means controlling communication between a corresponding one of said reservoirs and a corresponding service brake actuator.

9. Fluid pressure braking system comprising a spring brake actuator released by hold-off pressure, fluid pressure storage means for storing fluid pressure, a supply conduit for communicating fluid pressure to said storage means and control valve means intercommunicating the supply conduit, the storage means and the spring brake actuator, means for permitting fluid pressure communicated through said supply conduit to supply hold-off pressure to release said spring brake actuator before charging the storage means with fluid pressure and supplemental valve means opening when the hold-off pressure attains a predetermined level to permit charging of the storage means, said control valve means including a control port, said control valve means being responsive to a pressure signal at said control port to communicate said spring brake actuator with said supply line and with said storage means, said pressure signal supplied to the control port of said control valve means being the pressure level in said supply conduit.

10. Fluid pressure braking system as claimed in claim 9, wherein said supplemental valve means includes pressure protection valve means which closes to prevent communication into said storage means when the pressure level in said supply conduit is below a predetermined level, but opens to permit the supply conduit to charge the storage means when the hold-off pressure is above the predetermined level.

11. Fluid pressure braking system as claimed in claim 9, wherein said control valve means includes said supply port communicated to said storage means and to said supply conduit, and said control valve means is responsive to said pressure signal to communicate said supply port with the spring brake actuators.

12. Fluid pressure braking system as claimed in claim 11, wherein a supply conduit includes a bypass passage communicating the control and supply ports of said control valve, and one-way check valve means in said bypass passage permitting communication from said control port to said supply port, but preventing communication in the reverse direction.

13. Fluid pressure braking system as claimed in claim 11, wherein said storage means includes a pair of intercommunicated reservoirs, and service brake valve means controlling communication between one of said reservoirs and a service brake actuator, the other of said reservoirs being communicated to said supply port of said control valve means, said pressure protection valve means controlling communication between said supply line and said storage means, said pressure protection valve means closing to prevent communication into said storage means when the pressure level in said supply conduit is below a predetermined level, but opening to permit the supply conduit to charge the storage means when the pressure level in the conduit is above a predetermined level.

14. Fluid pressure braking system as claimed in claim 13, wherein said pressure protection valve means includes a pair of pressure protection valves separately protecting each of said reservoirs, there being at least two of said service brake actuators, and a pair of service brake valve means, each of said service brake valve means controlling communication between a corresponding one of said reservoirs and a corresponding service brake actuator.

15. Fluid pressure braking system as claimed in claim 9, wherein service brake valve means controls communication between said storage means and a service brake actuator and a control conduit for communicating a pressure signal to said service brake valve means causing the latter to communicate said storage means with the service brake actuator, said control conduit being communicated to the control port of said control valve means, and one-way check valve means permitting communication from said control conduit into said control port, but preventing communication in the reverse direction.

* * * * *